US011967189B2

(12) United States Patent
Brunda et al.

(10) Patent No.: US 11,967,189 B2
(45) Date of Patent: Apr. 23, 2024

(54) ROUTER FOR COMMUNICATING VEHICLE DATA TO A VEHICLE RESOURCE

(71) Applicant: Innova Electronics Corporation, Irvine, CA (US)

(72) Inventors: Bruce Brunda, Irvine, CA (US); David Rich, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 18/196,370

(22) Filed: May 11, 2023

(65) Prior Publication Data

US 2023/0282043 A1 Sep. 7, 2023

Related U.S. Application Data

(63) Continuation-in-part of application No. 16/853,538, filed on Apr. 20, 2020, now Pat. No. 11,651,628.

(51) Int. Cl.
*G07C 5/08* (2006.01)

(52) U.S. Cl.
CPC .................................. *G07C 5/0816* (2013.01)

(58) Field of Classification Search
None
See application file for complete search history.

(56) References Cited

U.S. PATENT DOCUMENTS 2,292,387 A 8/1942 Hedy et al.
2,960,654 A 11/1960 Nelson
(Continued)

FOREIGN PATENT DOCUMENTS

DE 3832123 C2 3/1990
DE 10139931 B4 2/2013
(Continued)

OTHER PUBLICATIONS

OTC's Latest Innovations, 1989 ( 6 pages), (month not available).
OTC's Latest Innovations, 1989 (6 pages).
Equus Products, Inc. Manual-ECM Code Reader, Model 3007, 1993 (18 pages).
Equus Products, Inc. Manual-ECM Code Reader, Model 3008, 1993 (5 pages).
Manuel-ECM Code Reader, Model 3007, 1993 by Equus Products, Inc. (18 pages).
(Continued)

*Primary Examiner* — Abdhesh K Jha
(74) *Attorney, Agent, or Firm* — Stetina Brunda Garred & Brucker

(57) ABSTRACT

A vehicle diagnostic system includes a first diagnostic server including a diagnostic database having historical data matched with possible vehicle fixes, and configured to receive retrieved vehicle data and identify a most likely vehicle fix associated therewith. The first diagnostic server is associated with a first processing capability. The system additionally includes a second diagnostic server including a diagnostic algorithm operatively associated therewith and configured to identify a possible vehicle fix based on an assessment of the retrieved diagnostic data according to predefined criteria associated with the diagnostic algorithm. The second diagnostic server is associated with a second processing capability. A diagnostic router is disposable in communication with the first and second diagnostic servers and is configured to determine which one of the first and second diagnostic servers to send retrieved diagnostic data based on an assessment of the retrieved data and the first and second processing capabilities.

30 Claims, 4 Drawing Sheets

(56) References Cited

U.S. PATENT DOCUMENTS 3,646,438 A 2/1972 Staff
4,112,748 A 9/1978 Walley
4,176,315 A 11/1979 Sunnarborg
4,207,611 A 6/1980 Gordon
4,404,639 A 9/1983 McGuire et al.
4,602,127 A 7/1986 Neely et al.
4,684,896 A 8/1987 Weishaupt
4,689,573 A 8/1987 Hilmer
4,831,560 A 5/1989 Zaleski
4,859,932 A 8/1989 Whitley
4,884,033 A 11/1989 McConchie, Sr.
5,003,478 A 3/1991 Kobayashi et al.
5,005,129 A 4/1991 Abe et al.
5,020,135 A 5/1991 Kasparian et al.
5,032,791 A 7/1991 Bates
5,107,428 A 4/1992 Bethencourt et al.
5,157,610 A 10/1992 Asano et al.
5,157,708 A 10/1992 Garthwaite et al.
5,170,125 A 12/1992 Bates
D334,560 S 4/1993 Wilson
5,214,582 A 5/1993 Gray
5,247,245 A 9/1993 Nelson
5,278,508 A 1/1994 Bowman
5,285,163 A 2/1994 Liotta
5,345,384 A 9/1994 Przybyla et al.
5,347,211 A 9/1994 Jakubowski
5,359,290 A 10/1994 Cervas
5,394,093 A 2/1995 Cervas
5,400,018 A 3/1995 Scholl et al.
5,442,553 A 8/1995 Parrillo
5,481,906 A 1/1996 Nagayoshi et al.
5,491,418 A 2/1996 Alfaro et al.
5,491,631 A 2/1996 Shirane et al.
5,499,182 A 3/1996 Ousborne
5,506,772 A 4/1996 Kubozono et al.
5,519,397 A 5/1996 Chapotot et al.
5,532,927 A 7/1996 Pink et al.
5,535,274 A 7/1996 Braitberg et al.
5,541,840 A 7/1996 Gurne et al.
D377,622 S 1/1997 Chen et al.
5,619,412 A 4/1997 Hapka
5,623,922 A 4/1997 Smith
5,631,831 A 5/1997 Bird et al.
5,635,841 A 6/1997 Taylor
5,657,233 A 8/1997 Cherrington et al.
5,668,880 A 9/1997 Alajajian
5,671,141 A 9/1997 Smith et al.
5,732,074 A 3/1998 Spaur et al.
5,758,300 A 5/1998 Abe
5,767,681 A 6/1998 Huang
5,794,164 A 8/1998 Beckert et al.
5,808,907 A 9/1998 Shetty et al.
5,809,437 A 9/1998 Breed
5,848,365 A 12/1998 Coverdill
5,859,628 A 1/1999 Ross et al.
5,875,413 A 2/1999 Vinci
5,884,202 A 3/1999 Arjomand
5,897,605 A 4/1999 Kohli et al.
5,916,286 A 6/1999 Seashore et al.
5,935,180 A 8/1999 Fieramosca et al.
5,961,561 A 10/1999 Wakefield, II
6,000,413 A 12/1999 Chen
6,006,146 A 12/1999 Usui et al.
6,021,366 A 2/2000 Fieramosca et al.
6,029,000 A 2/2000 Woolsey et al.
6,031,497 A 2/2000 Nam
6,052,631 A 4/2000 Busch et al.
6,055,468 A 4/2000 Kaman et al.
6,061,638 A 5/2000 Joyce
6,094,609 A 7/2000 Arjomand
6,097,998 A 8/2000 Lancki
6,104,988 A 8/2000 Klarer
6,122,514 A 9/2000 Spaur et al.
6,139,120 A 10/2000 Fukada
6,141,608 A 10/2000 Rother
6,225,898 B1 5/2001 Kamiya et al.
6,250,077 B1 6/2001 Iino et al.
6,263,265 B1 7/2001 Fera
6,263,268 B1 7/2001 Nathanson
6,263,322 B1 7/2001 Kirkevold et al.
6,272,402 B1 8/2001 Kelwaski
6,295,492 B1 9/2001 Lang et al.
6,314,422 B1 11/2001 Barker et al.
6,330,499 B1 12/2001 Chou et al.
6,359,422 B1 3/2002 Lewis
6,370,454 B1 4/2002 Moore
6,389,337 B1 5/2002 Kolls
6,434,455 B1 8/2002 Snow et al.
6,438,471 B1 8/2002 Katagishi et al.
6,442,460 B1 8/2002 Larson et al.
6,459,969 B1 10/2002 Bates et al.
6,473,659 B1 10/2002 Shah et al.
6,499,385 B2 12/2002 Protti
6,535,112 B1 * 3/2003 Rothschink ............ G07C 5/008
340/425.5
6,535,802 B1 3/2003 Kramer
6,587,768 B2 7/2003 Chene et al.
6,594,579 B1 7/2003 Lowrey et al.
6,604,033 B1 8/2003 Banet et al.
6,611,740 B2 8/2003 Lowrey et al.
6,636,790 B1 10/2003 Lightner et al.
6,650,318 B1 11/2003 Amon
6,677,854 B2 1/2004 Dix
6,680,675 B1 1/2004 Suzuki
6,687,584 B2 2/2004 Andreasen et al.
6,701,233 B2 3/2004 Namaky et al.
6,718,425 B1 4/2004 Pajakowski et al.
6,732,031 B1 5/2004 Lightner et al.
6,738,696 B2 5/2004 Oi
6,738,697 B2 5/2004 Breed
6,768,935 B1 7/2004 Morgan et al.
6,771,073 B2 8/2004 Henningson et al.
6,807,469 B2 10/2004 Funkhouser et al.
6,823,243 B2 11/2004 Chinnadurai et al.
6,832,141 B2 12/2004 Skeen et al.
6,836,708 B2 12/2004 Tripathi
6,847,916 B1 1/2005 Ying
6,868,369 B2 3/2005 Huang et al.
6,940,270 B2 9/2005 Chen
6,941,203 B2 9/2005 Chen
D510,287 S 10/2005 Chen et al.
6,957,133 B1 10/2005 Hunt et al.
6,968,733 B2 11/2005 Andreasen et al.
7,012,512 B2 3/2006 St. Denis
7,030,742 B2 4/2006 Treadway
7,073,714 B2 7/2006 Namaky et al.
7,085,680 B2 8/2006 Huang
7,089,099 B2 8/2006 Shostak et al.
7,103,460 B1 9/2006 Breed
7,116,216 B2 10/2006 Andreasen et al.
7,209,813 B2 4/2007 Namaky
D545,223 S 6/2007 Chen
D558,621 S 1/2008 Rich et al.
D559,137 S 1/2008 Protti
D560,129 S 1/2008 Rich et al.
D560,527 S 1/2008 Rich et al.
7,321,774 B1 1/2008 Lau et al.
7,325,775 B2 2/2008 Chen
D563,249 S 3/2008 Chen
7,363,149 B2 4/2008 Klausner et al.
D569,280 S 5/2008 Chen
7,376,497 B2 5/2008 Chen
D571,241 S 6/2008 Andreasen et al.
7,409,317 B2 8/2008 Cousin et al.
7,421,321 B2 9/2008 Breed et al.
7,437,227 B2 10/2008 Andreasen et al.
D581,822 S 12/2008 Madison et al.
7,464,000 B2 12/2008 Huang
D588,621 S 3/2009 Baty
D590,387 S 4/2009 Chen
7,520,668 B2 4/2009 Chen
7,590,476 B2 9/2009 Shumate
7,603,293 B2 10/2009 Chenn
7,620,484 B1 11/2009 Chen

(56) References Cited

U.S. PATENT DOCUMENTS

| | | | |
|---|---|---|---|
| 7,627,406 B2 | 12/2009 | Wang et al. | |
| D610,586 S | 2/2010 | Chen | |
| 7,684,908 B1 | 3/2010 | Ogilvie et al. | |
| 7,734,287 B2 | 6/2010 | Ying | |
| 7,778,750 B2 | 8/2010 | Knight et al. | |
| D624,446 S | 9/2010 | Chen et al. | |
| D624,838 S | 10/2010 | Chen et al. | |
| D625,209 S | 10/2010 | Chen et al. | |
| D625,210 S | 10/2010 | Chen et al. | |
| D625,634 S | 10/2010 | Chen et al. | |
| 7,891,004 B1 | 2/2011 | Gelvin et al. | |
| 7,904,219 B1 | 3/2011 | Lowrey et al. | |
| 8,019,503 B2 | 9/2011 | Andreasen et al. | |
| 8,024,083 B2 | 9/2011 | Chenn | |
| D646,188 S | 10/2011 | Chen et al. | |
| D646,599 S | 10/2011 | Chen et al. | |
| 8,032,878 B2 | 10/2011 | Nakagaki | |
| 8,068,951 B2 | 11/2011 | Chen et al. | |
| 8,095,261 B2 | 1/2012 | Howell et al. | |
| 8,131,417 B2 | 3/2012 | Picard | |
| 8,135,506 B2 | 3/2012 | Hansen et al. | |
| 8,195,231 B2 | 6/2012 | Ring | |
| 8,239,094 B2 | 8/2012 | Underdal et al. | |
| 8,301,329 B2 | 10/2012 | Andreasen et al. | |
| 8,306,687 B2 | 11/2012 | Chen | |
| 8,370,018 B2 | 2/2013 | Andreasen et al. | |
| 8,509,986 B1 | 8/2013 | Chen | |
| 8,600,610 B2 | 12/2013 | Bertosa et al. | |
| 8,630,765 B2 | 1/2014 | Chen | |
| 8,677,019 B2 | 3/2014 | Bruenner et al. | |
| 8,811,008 B2 | 8/2014 | Selkirk et al. | |
| 8,825,270 B2 | 9/2014 | Chen | |
| 8,825,271 B2 * | 9/2014 | Chen | G06Q 10/20 701/29.6 |
| 8,855,621 B2 | 10/2014 | Chen | |
| 8,862,117 B2 | 10/2014 | Chen | |
| 8,892,271 B2 | 11/2014 | Breed | |
| 8,909,416 B2 | 12/2014 | Chen et al. | |
| 8,930,041 B1 | 1/2015 | Grimm et al. | |
| 9,002,554 B2 | 4/2015 | Chen | |
| 9,014,908 B2 | 4/2015 | Chen et al. | |
| 9,019,092 B1 | 4/2015 | Brandmaier et al. | |
| 9,026,400 B2 | 5/2015 | Chen et al. | |
| 9,117,319 B2 | 8/2015 | Chen et al. | |
| 9,123,051 B2 | 9/2015 | Chen | |
| 9,141,503 B1 | 9/2015 | Chen | |
| 9,177,428 B2 | 11/2015 | Nguyen et al. | |
| 9,183,681 B2 | 11/2015 | Fish | |
| D745,029 S | 12/2015 | Gray et al. | |
| D746,316 S | 12/2015 | Gray et al. | |
| D746,323 S | 12/2015 | Gray et al. | |
| 9,213,332 B2 | 12/2015 | Fish et al. | |
| D747,734 S | 1/2016 | Gray et al. | |
| D749,623 S | 2/2016 | Gray et al. | |
| 9,262,254 B2 | 2/2016 | Bertosa et al. | |
| 9,324,194 B2 | 4/2016 | Pham | |
| D757,059 S | 5/2016 | Gray et al. | |
| 9,342,934 B2 | 5/2016 | Chen | |
| 9,430,883 B2 | 8/2016 | Busse et al. | |
| D770,462 S | 11/2016 | Gray et al. | |
| 9,494,125 B2 | 11/2016 | Pham et al. | |
| 9,646,427 B2 | 5/2017 | Chen et al. | |
| 9,646,432 B2 | 5/2017 | Madison et al. | |
| 9,761,066 B2 | 9/2017 | Chen et al. | |
| 9,858,731 B2 | 1/2018 | Fish et al. | |
| 9,904,634 B2 | 2/2018 | Case, Jr. et al. | |
| 10,295,333 B2 | 5/2019 | Fish et al. | |
| 10,467,906 B2 | 11/2019 | Fish et al. | |
| 2001/0033225 A1 | 10/2001 | Razavi et al. | |
| 2001/0053983 A1 | 12/2001 | Reichwein et al. | |
| 2002/0007225 A1 | 1/2002 | Costello et al. | |
| 2002/0007237 A1 | 1/2002 | Phung et al. | |
| 2002/0010541 A1 | 1/2002 | Houston et al. | |
| 2002/0016655 A1 | 2/2002 | Joao | |
| 2002/0035421 A1 | 3/2002 | Warkentin | |
| 2002/0110146 A1 | 8/2002 | Thayer et al. | |
| 2002/0128985 A1 | 9/2002 | Greenwald | |
| 2002/0156692 A1 | 10/2002 | Squeglia et al. | |
| 2002/0193925 A1 | 12/2002 | Funkhouser et al. | |
| 2003/0060953 A1 | 3/2003 | Chen | |
| 2003/0078039 A1 | 4/2003 | Grossi et al. | |
| 2003/0138475 A1 | 7/2003 | Chen | |
| 2003/0171111 A1 | 9/2003 | Clark | |
| 2003/0177417 A1 | 9/2003 | Malhotra et al. | |
| 2003/0195681 A1 | 10/2003 | Rother | |
| 2004/0044454 A1 | 3/2004 | Ross et al. | |
| 2004/0064225 A1 | 4/2004 | Jammu et al. | |
| 2004/0088087 A1 | 5/2004 | Fukushima et al. | |
| 2004/0093155 A1 | 5/2004 | Simonds et al. | |
| 2004/0110472 A1 | 6/2004 | Witkowski et al. | |
| 2004/0153362 A1 | 8/2004 | Bauer et al. | |
| 2004/0153884 A1 | 8/2004 | Fields et al. | |
| 2004/0154715 A1 | 8/2004 | Dufournier | |
| 2004/0172177 A1 | 9/2004 | Nagai et al. | |
| 2004/0203379 A1 | 10/2004 | Witkowski et al. | |
| 2004/0227523 A1 | 11/2004 | Namaky | |
| 2004/0249557 A1 | 12/2004 | Harrington et al. | |
| 2005/0021294 A1 | 1/2005 | Trsar et al. | |
| 2005/0035852 A1 | 2/2005 | Paulsen | |
| 2005/0060070 A1 | 3/2005 | Kapolka et al. | |
| 2005/0065678 A1 | 3/2005 | Smith et al. | |
| 2005/0125115 A1 | 6/2005 | Hiwatashi et al. | |
| 2005/0143882 A1 | 6/2005 | Umezawa | |
| 2005/0192727 A1 | 9/2005 | Shostak et al. | |
| 2005/0203683 A1 | 9/2005 | Olsen et al. | |
| 2005/0228560 A1 | 10/2005 | Doherty et al. | |
| 2005/0267655 A1 | 12/2005 | Gessner | |
| 2005/0273218 A1 | 12/2005 | Breed et al. | |
| 2006/0027650 A1 | 2/2006 | Andreasen et al. | |
| 2006/0041349 A1 | 2/2006 | Chinnadurai et al. | |
| 2006/0095230 A1 | 5/2006 | Grier et al. | |
| 2006/0101311 A1 | 5/2006 | Lipscomb et al. | |
| 2006/0149434 A1 | 7/2006 | Bertosa et al. | |
| 2006/0161313 A1 | 7/2006 | Rogers et al. | |
| 2006/0161390 A1 | 7/2006 | Namaky et al. | |
| 2007/0005201 A1 | 1/2007 | Chenn | |
| 2007/0005204 A1 | 1/2007 | Yamamoto et al. | |
| 2007/0010922 A1 | 1/2007 | Buckley | |
| 2007/0038338 A1 | 2/2007 | Larschan et al. | |
| 2007/0073459 A1 | 3/2007 | Webster et al. | |
| 2007/0152503 A1 | 7/2007 | Kowalick | |
| 2007/0233341 A1 | 10/2007 | Logsdon | |
| 2007/0250228 A1 | 10/2007 | Reddy et al. | |
| 2007/0296559 A1 | 12/2007 | Fehr | |
| 2008/0004764 A1 | 1/2008 | Chinnadurai et al. | |
| 2008/0015748 A1 | 1/2008 | Nagy | |
| 2008/0045274 A1 | 2/2008 | Witkowski et al. | |
| 2008/0071439 A1 | 3/2008 | Bertosa et al. | |
| 2008/0119981 A1 | 5/2008 | Chen | |
| 2008/0133432 A1 | 6/2008 | Ramseyer | |
| 2008/0140281 A1 | 6/2008 | Morris et al. | |
| 2008/0154755 A1 | 6/2008 | Lamb, III | |
| 2008/0177438 A1 | 7/2008 | Chen et al. | |
| 2008/0195271 A1 | 8/2008 | Bertosa et al. | |
| 2008/0255721 A1 | 10/2008 | Yamada | |
| 2009/0006476 A1 | 1/2009 | Andreasen et al. | |
| 2009/0062978 A1 | 3/2009 | Picard | |
| 2009/0216401 A1 | 8/2009 | Underdal et al. | |
| 2009/0248222 A1 | 10/2009 | McGarry et al. | |
| 2009/0259358 A1 | 10/2009 | Andreasen | |
| 2009/0276115 A1 | 11/2009 | Chen | |
| 2010/0138701 A1 | 6/2010 | Costantino | |
| 2010/0185356 A1 | 7/2010 | Haas et al. | |
| 2010/0229044 A1 | 9/2010 | Fountain et al. | |
| 2010/0256861 A1 | 10/2010 | Hodges | |
| 2011/0071720 A1 | 3/2011 | Schondorf et al. | |
| 2011/0123039 A1 | 5/2011 | Hirschfeld et al. | |
| 2011/0144869 A1 | 6/2011 | Dix et al. | |
| 2011/0184784 A1 | 7/2011 | Rudow et al. | |
| 2011/0224866 A1 | 9/2011 | Chen | |
| 2011/0264322 A1 | 10/2011 | Chen | |
| 2011/0288954 A1 | 11/2011 | Bertosa et al. | |
| 2011/0307144 A1 | 12/2011 | Wu et al. | |
| 2012/0053778 A1 | 3/2012 | Colvin et al. | |

(56) References Cited

U.S. PATENT DOCUMENTS

| | | | | |
|---|---|---|---|---|
| 2012/0212499 | A1 | 8/2012 | Haddick et al. | |
| 2012/0215398 | A1 | 8/2012 | Chen et al. | |
| 2013/0127980 | A1 | 5/2013 | Haddick et al. | |
| 2013/0201316 | A1 | 8/2013 | Binder et al. | |
| 2013/0204485 | A1 | 8/2013 | Chen et al. | |
| 2013/0246135 | A1* | 9/2013 | Wang | G07C 5/0808 701/2 |
| 2013/0304278 | A1 | 11/2013 | Chen | |
| 2013/0317694 | A1 | 11/2013 | Merg et al. | |
| 2014/0032014 | A1 | 1/2014 | DeBiasio et al. | |
| 2014/0046508 | A1 | 2/2014 | Himmelstein | |
| 2014/0046800 | A1 | 2/2014 | Chen | |
| 2014/0052328 | A1 | 2/2014 | Nguyen et al. | |
| 2014/0052531 | A1 | 2/2014 | Kent et al. | |
| 2014/0121888 | A1 | 5/2014 | Guo et al. | |
| 2014/0188331 | A1 | 7/2014 | Amirpour et al. | |
| 2014/0195098 | A1 | 7/2014 | Lorenz et al. | |
| 2014/0195099 | A1 | 7/2014 | Chen | |
| 2014/0195101 | A1 | 7/2014 | Chen et al. | |
| 2014/0288761 | A1 | 9/2014 | Butler et al. | |
| 2014/0297097 | A1 | 10/2014 | Hurwitz | |
| 2014/0316639 | A1 | 10/2014 | Braswell | |
| 2015/0032607 | A1 | 1/2015 | Chen | |
| 2015/0045993 | A1 | 2/2015 | Cooper et al. | |
| 2015/0066781 | A1 | 3/2015 | Johnson et al. | |
| 2015/0088334 | A1 | 3/2015 | Bowers et al. | |
| 2015/0105972 | A1 | 4/2015 | Madison et al. | |
| 2015/0161893 | A1 | 6/2015 | Duncan et al. | |
| 2015/0170439 | A1 | 6/2015 | Chen et al. | |
| 2015/0187146 | A1 | 7/2015 | Chen et al. | |
| 2015/0206357 | A1 | 7/2015 | Chen et al. | |
| 2015/0226563 | A1 | 8/2015 | Cox et al. | |
| 2015/0228129 | A1 | 8/2015 | Cox et al. | |
| 2015/0269793 | A1 | 9/2015 | Collins et al. | |
| 2015/0346718 | A1 | 12/2015 | Stenneth | |
| 2016/0027223 | A1 | 1/2016 | Madison et al. | |
| 2016/0046373 | A1 | 2/2016 | Kugelmass | |
| 2016/0078403 | A1 | 3/2016 | Sethi et al. | |
| 2016/0114745 | A1 | 4/2016 | Ricci | |
| 2016/0147223 | A1 | 5/2016 | Edwards et al. | |
| 2016/0188195 | A1 | 6/2016 | Chen | |
| 2016/0194014 | A1 | 7/2016 | Rajendran | |
| 2017/0048080 | A1 | 2/2017 | Grimm et al. | |
| 2017/0110012 | A1 | 4/2017 | Lewis et al. | |
| 2017/0122841 | A1 | 5/2017 | Dudar et al. | |
| 2017/0186054 | A1 | 6/2017 | Fish et al. | |
| 2017/0228709 | A1* | 8/2017 | Dhaliwal | H04W 4/029 |
| 2017/0267192 | A1 | 9/2017 | Chen | |
| 2017/0340908 | A1* | 11/2017 | Heath | A62C 37/44 |
| 2017/0345229 | A1* | 11/2017 | Huang | B60T 17/22 |
| 2018/0101775 | A1 | 4/2018 | Fish | |
| 2018/0137693 | A1 | 5/2018 | Raman | |
| 2018/0201187 | A1* | 7/2018 | Yellambalase | B60L 50/51 |
| 2018/0293811 | A1* | 10/2018 | Liu | G07C 5/0808 |
| 2019/0019356 | A1* | 1/2019 | Liu | G05B 23/0283 |
| 2019/0197497 | A1* | 6/2019 | Abari | G05D 1/0088 |
| 2019/0316916 | A1* | 10/2019 | Perry | G01C 21/3608 |
| 2020/0236521 | A1* | 7/2020 | Vassilovski | G08B 29/188 |

FOREIGN PATENT DOCUMENTS

| | | | |
|---|---|---|---|
| FR | 2641085 | B1 | 5/1991 |
| JP | H079388 | B2 | 2/1995 |
| JP | H07018779 | B2 | 3/1995 |
| WO | WO186576 | | 8/2001 |

OTHER PUBLICATIONS

Manuel-ECM Code Reader-Model 3008, 1993 by Equus Products, Inc. (5 pages).

Equus Products, Inc. Catalog, Automotive Testers, Gauge and Tachometers and Cruise Control, 1995 (28 pages).

Sensor Testers Product Comparison (4 pages), 1995, (month not available).

Sunpro Sensor Testers Product Comparison, 1995 (4 pages).

Sunpro Catalog by Actron, Nov. 1996 (20 pages).

Equus Products, Inc. Catalog, 1998 (32 pages).

OTC System 2000 Diagnostic Testers and Tool (24 pages), undated, (date not available.

OTC System 2000 Diagnostic Testers and Tools, undated (24 pages).

EPA Performing Onbard Diagnostic System Checks as Part of a Vehicle Inspection and Maintenance Program, Jun. 2001, 25 pages). *.

EPA Performing Onboard Diagnostic System Checks as Part of a Vehicle Inspection and Maintenance Program, Jun. 2001 (25 pages).

U.S. Department of Transportation—National Highway Traffic Safety Administration (Daniel C. Smith) Federal Motor Vehicle Safety Standards: Vehicle-to-Vehicle (V2V) Communications, Aug. 20, 2014; 9 pages, Federal Register vol. 79, No. 161, Washington, D.C.

SAE International, SAE Vehicle Interface Methodology Standard Proposal—Status Report Dec. 2015 SC31 Meeting in Auburn Hills, MI, Sep. 22, 2016, 11 pages, www.sae.org.

Babcox Media, Inc., Telematics Talk WEX Awarded Homeland Security Purchase Agreement for Telematics Products and Services, Aug. 25, 2017.

SAE International, Surface Vehicle Standard J2735, Dedicated Short Range Communications (DSRC) Message Set Dictionary, Mar. 2016, 267 pages, www.sae.org.

SAE International, Surface Vehicle Standard J2945/1, On-Board System Requirements for V2V Safety Communications, Mar. 2016, 127 pages, www.sae.org.

Actron, Scan Tools, Autoscanner Plus CP9580, Dec. 21, 2011, www.actron.com/product_detail.php?pid=16364.

U.S. Department of Transportation—National Highway Traffic Safety Administration, NHTSA Issues Notice of Proposed Rulemaking and Research Report on Vehicle-to-Vehicle Communications, Vehicle-to-Vehicle Communication Technology, Dec. 13, 2016, 4 pages, vol. 1, https://icsw.nhtsa.gov/safercar/v2v/pdf/V2V_NPRM_Fact_Sheet_121316_v1.pdf.

* cited by examiner

ROUTER FOR COMMUNICATING VEHICLE DATA TO A VEHICLE RESOURCE

CROSS-REFERENCE TO RELATED APPLICATIONS

The present application is a continuation-in-part application of U.S. patent application Ser. No. 16/853,538 entitled ROUTER FOR VEHICLE DIAGNOSTIC SYSTEM filed Apr. 20, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a router for routing vehicle data, and more specifically, to a router capable of routing vehicle data based on an assessment of available resources and a desired functionality associated with the vehicle data.

2. Description of the Related Art

Over the years, vehicles have evolved into sophisticated electromechanical machines, that incorporate electrical sensors and computers into the overall mechanical framework of the vehicle. During operation of the vehicle, the electrical components and systems on the vehicle may generate data representative of the operation and health of the vehicle. The onboard systems may monitor the generated data and when the data reveals operation of a particular component or system outside of an acceptable operable range, a fault code may be generated and stored locally on the vehicle.

Data stored on the vehicle may be retrieved by a mechanic or owner of the vehicle to conduct a diagnosis of the vehicle. For instance, a scan tool may be connected into a diagnostic port on the vehicle to retrieve the data from an onboard computer. The data retrieved from the vehicle may include diagnostic codes, as well as the underlying live data which triggered the code(s), or otherwise relates to the code(s). Sensor data, freeze frame data, operational data, may also be retrieved from the vehicle for diagnostic purposes. In this regard, the retrieval and analysis of data may be analogous to a blood test for the vehicle. The data may be analyzed based on a comparison with historical information, by use of a diagnostic algorithm or by use of other diagnostic techniques. Implementation of the preferred vehicle diagnostic methodology may require the transfer of data from the vehicle to whatever resource is being used to analyze the data, such as a remote diagnostic database.

In addition to automotive diagnostics, data transfer from the vehicle has also been critical to the development of autonomous or driverless vehicles, which may be capable of sensing its environment and navigating without human input. Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination.

Individual autonomous vehicles may benefit from information obtained from not only their own information system, but also from information systems operating on other vehicles in the vicinity, which may be useful as a way to communicate information relating to upcoming traffic congestion and safety hazards. As such, vehicular communication systems may use other vehicles and roadside units as the communicating nodes in a peer-to-peer network, providing each other with information. By using such a cooperative approach, vehicular communication systems can allow all cooperating vehicles to be more effective. According to a 2010 study by the National Highway Traffic Safety Administration, vehicular communication systems could help avoid up to 79 percent of all traffic accidents.

The communications systems to implement the connected vehicle applications include vehicle-to vehicle (V2V) and vehicle-to-infrastructure (V2I) applications that require a minimum of one entity to send information to another entity. Broadly, short range communications that occur between a vehicle and any similarly equipped external object may be collectively referred to as "V2X" communications. For example, many vehicle-to-vehicle safety applications can be executed on one vehicle by simply receiving broadcast messages from one or more neighboring vehicles. These messages are not necessarily directed to any specific vehicle, but are meant to be shared with a vehicle population to support the safety application. In these types of applications where collision avoidance is desirable, as two or more vehicles talk to one another in a setting where a collision becomes probable, the vehicle systems can warn the vehicle drivers, or possibly take action for the driver, such as applying the brakes. Likewise, roadway infrastructure components, such as traffic control units, can observe the information broadcasts or otherwise sense vehicle traffic and provide a driver warning if there is a detected hazard (e.g., if a vehicle is approaching a curve at an unsafe speed or there is a crossing vehicle that is violating a red traffic signal phase).

It would also be useful to interface vehicle diagnostic resources to the V2X data stream, to allow vehicle defects, diagnostic solutions and related information to be identified and addressed, even where the vehicle is not itself associated with any diagnostic processing resources.

In view of the widespread use of vehicle data, there is a need in the art for a system and method of efficiently routing the information, including vehicle diagnostic information, based on any number of a variety of different factors, such as resource availability, intended functionality, latencies associated with different resources, urgency, etc. Various aspects of the present disclosure address this particular need, as will be discussed in more detail below.

BRIEF SUMMARY

Various aspects of the present disclosure are related to systems and methods of routing vehicle data to efficiently and quickly process the data and implement desired functionalities. Data may be received from a vehicle and may be used from a variety of different resources (e.g., a diagnostic database, a diagnostic algorithm, a V2X data stream, etc.) for a variety of different purposes (e.g., determining a most likely fix, alerting nearby drivers of a critical condition, etc.). The determination of which resources are used and which functionalities are executed may be determined by a variety of different factors, such as the processing ability of each resource, processing latency, diagnostic urgency, or preprogrammed conditions.

In accordance with one embodiment of the present disclosure there is provided a vehicle diagnostic system comprising a vehicle data acquisition and transfer device connectable to a diagnostic port on a vehicle to retrieve vehicle data therefrom. The vehicle data includes, but is not limited to, vehicle identification information and vehicle diagnostic data. The system may include a first diagnostic server disposable in communication with the vehicle data acquisition and transfer device, and including a diagnostic database having the ability to match historical data with possible/most likely vehicle fixes. The first diagnostic server may be configured to receive the retrieved vehicle data and identify a most likely vehicle fix associated with the retrieved vehicle data. The first diagnostic server may be associated with a first processing capability.

The system may additionally include a second diagnostic server having a diagnostic algorithm loaded thereon and operatively associated therewith and configured to identify a possible vehicle fix based on an assessment of the retrieved diagnostic data according to predefined criteria associated with the diagnostic algorithm. The second diagnostic server may be associated with a second processing capability.

The system may additionally include a diagnostic router disposable in communication with the vehicle data acquisition and transfer device and with the first and/or second diagnostic servers. The diagnostic router may be configured to determine which one of the first and second diagnostic servers to send the retrieved diagnostic data, based on an assessment of the retrieved data and the first and second processing capabilities.

The data acquisition and transfer (DAT) device may be implemented as a dongle or a scan tool. The first and second diagnostic servers may be located remote from the DAT device. The diagnostic router may, for example, be disposed intermediate the diagnostic port and a scan tool. The diagnostic router may alternatively be disposed intermediate the diagnostic port and the first diagnostic server. The diagnostic router may be implemented on the DAT device, or an associated programmable cellphone or other communication device. The second diagnostic server may be located on the DAT device, and the first diagnostic server may be remote from the scan tool.

The first processing capability may encompass a first latency period associated with processing at least a portion of the received vehicle data at the first diagnostic server. The second processing capability may encompass a second latency period associated with processing at least a portion of the received vehicle data at the second diagnostic server. The diagnostic router may be operative to compare the first latency period with the second latency period. As will be apparent to one of ordinary skill in the art, the respective latency periods and other processing characteristics/abilities may vary depending upon the nature of the received vehicle data, and the desired processing functionality.

The first processing capability may encompass processing vehicle data stored in the diagnostic database, and the second processing capability may encompass processing vehicle data using the diagnostic algorithm.

According to another embodiment of the present disclosure, there is provided a vehicle diagnostic method including receiving vehicle data from a vehicle computer at a diagnostic router, with the vehicle data including vehicle diagnostic data and vehicle identification information. The method additionally includes deriving first processing capability information associated with a first diagnostic server, with the first diagnostic server having historical data matched with possible vehicle fixes. The first diagnostic server is preferably configured to receive retrieved vehicle data and identify a possible vehicle fix associated with the retrieved vehicle data. The method further comprises deriving second processing capability information associated with a second diagnostic server, with the second diagnostic server including a diagnostic algorithm operatively associated therewith and configured to identify a possible vehicle fix based on an assessment of the retrieved vehicle diagnostic data according to predefined criteria associated with the diagnostic algorithm. The method additionally includes comparing the first processing capability information with the second processing capability information to determine which one of the first and second diagnostic servers to send the retrieved diagnostic data, or portions thereof.

The method may include receiving the possible vehicle fix from the first diagnostic server or the second diagnostic server at a handheld communication device.

The method may also include communicating the possible vehicle fix identified by the first diagnostic server or the second diagnostic server to a V2X infrastructure.

The vehicle data received at the diagnostic router may be received from a diagnostic scan tool or from a V2X infrastructure.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a data router in a vehicle communication system, and related methodologies, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to the routing of vehicle data to one or more resources or destination based on one or more factors, such as desired functionality, processing latency, resource availability and capability, and operational urgency or diagnostic urgency. One embodiment may include a diagnostic router deployed within a vehicle diagnostic system for determining where vehicle data or related information should be communicated. For instance, the vehicle data may be communicated to a diagnostic database or a diagnostic algorithm for diagnostic analysis. It is also contemplated that the vehicle data may indicate an urgent problem with the vehicle, and thus, an alert signal may be routed to the driver, as well as to a V2X infrastructure to alert nearby drivers of the urgent condition. Thus, the router may allow for a more efficient implementation of desired diagnostic functionality by relying on a comprehensive network of resources and their known capabilities.

Figure 1:
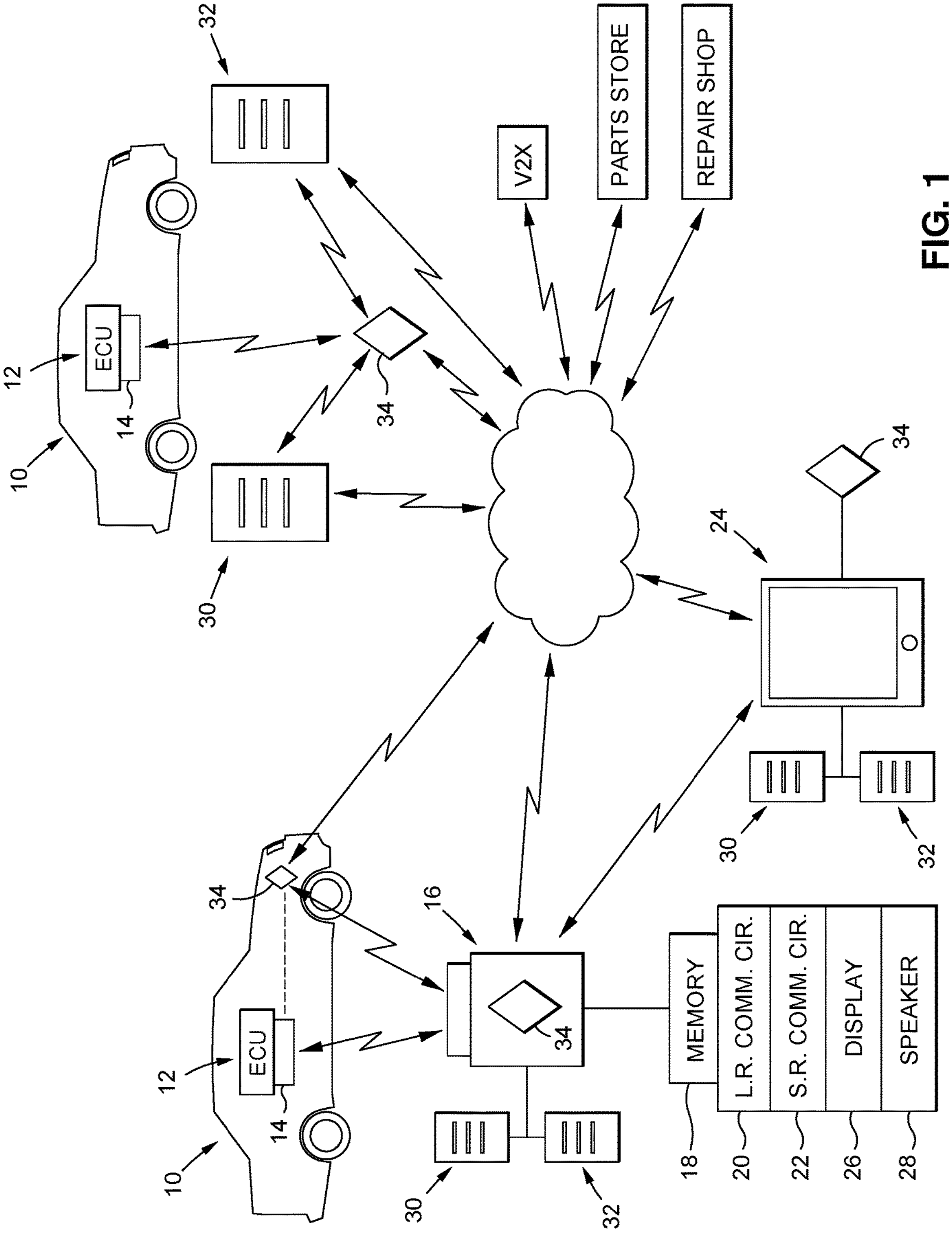
FIG. 1 is a vehicle diagnostic system including several diagnostic routers for routing data based on resource availability and desired functionality.

Referring now specifically to FIG. 1, there is depicted a vehicle 10 having an electronic control unit (ECU) 12, which includes one or more onboard computers in communication with one or more sensors or systems on the vehicle 10. The vehicle 10 may produce vehicle data during operation of the vehicle 10. The vehicle data may include diagnostic trouble codes (DTCs), live data, freeze frame data, parameter id (PID) data, sensor data, etc. The vehicle data may be stored on the ECU 12 and accessed through a diagnostic port 14 located on the vehicle 10. The ECU 12 may also have vehicle identification information, such as an electronic vehicle identification number, or information related to the year, make, model, and engine, stored thereon and available for retrieval.

A vehicle data acquisition and transfer (DAT) device 16 is connectable to the diagnostic port 14 on the vehicle 10 to retrieve vehicle data therefrom. The device 16 may include a scan tool, a dongle or other hardware capable of communicating with the ECU 12. The device 16 may be plug connectable to the diagnostic port 14 to place the device 16 in wired communication with the ECU 12 to facilitate data transfer therebetween. Alternatively, the device 16 and the ECU 12 may both be configured to facilitate wireless communication between the ECU 12 and the device 16. Such hardware may be located on the vehicle 10, in the vehicle 10, or outside of the vehicle 10, e.g., in the case of a V2X system.

The device 16 may include an internal memory 18 for storing preprogrammed operating instructions thereon, as well as for storing data received by the device 16, such as vehicle data or alerts, as will be described in more detail below. The device 16 may also include a long-range communication circuit 20 for facilitating bi-directional wireless communication over a communication network, such as a cellular communication network, cloud-based communications, or communications over the Internet. The device 16 may also include a short-range communication circuit 22 for facilitating bi-directional wireless communication with a nearby electronic device, such as with a smartphone 24 via Bluetooth™, or other short-range communication protocols. The device 16 may include a display screen 26 for displaying information or providing visual alerts to a user. The device 16 may also include a speaker 28 for communicating audible alerts to a user.

As noted above, the device 16 may be disposable in communication with a smartphone 24 or other handheld communication device (e.g., tablet computer, smart watch, etc.). The smartphone 24 may be used as a communication relay between the device 16 and a remote destination. The smartphone 24 may also be used to display retrieved vehicle data or information related thereto. The smartphone 24 may have operating instructions, such as an application ("app.") that facilitates processing of vehicle data.

FIG. 1 additionally includes a first diagnostic server 30 and a second diagnostic server 32. The first diagnostic server 30 may include a database of historical data matched with possible vehicle fixes. Accordingly, when vehicle data is retrieved from a vehicle 10, the first diagnostic server 30 may be configured to receive the retrieved vehicle data and identify a most likely vehicle fix associated with the retrieved vehicle data. The analysis of the vehicle data may be vehicle specific, such that the vehicle identification information of the vehicle under test is used to identify vehicle data stored in the database and associated with similar or identical vehicle identification information. The solution associated with vehicle data most closely corresponding to the retrieved vehicle data, and which may be associated with vehicle identification information similar to the vehicle under test may be considered the most likely fix. Once the most likely fix is identified, the first diagnostic server 30 may send a signal to the user via the smartphone 24 or scan tool 16, with the signal identifying the most likely fix. For more information related to one process for analyzing vehicle data and the use of a diagnostic database to determine a most likely fix, please refer to U.S. Pat. No. 8,370,018 entitled Automotive Diagnostic Process, and U.S. Pat. No. 9,646,432 entitled Hand Held Data Retrieval Device with Fixed Solutions Capability, the contents of both of which are expressly incorporated herein by reference.

The first diagnostic server 30 may also be capable of performing predictive diagnostics, wherein the vehicle identification data is analyzed along with the current mileage of the vehicle, and compared to historical data stored in the database including the mileage when faults occurred to predict future diagnostic events for the vehicle under test. For more information related to predictive diagnostics, please refer to U.S. Patent Application Publication No. 2016/0027223, entitled Predictive Diagnostic Method, the contents of which are expressly incorporated herein by reference.

The first diagnostic server 30 is also associated with a first processing capability, which may relate to a variety of different factors. The first processing capability may refer to a latency period (e.g., a first latency period) associated with processing vehicle data to determine a most likely fix. The first latency period may be dependent upon the speed of the communication links which supply the vehicle data to the first diagnostic server, the speed of processing data at the first diagnostic server, and the speed of the communication links along which information is transmitted from the first diagnostic server. In this regard, the first latency period may refer to the time that elapses from the time a request is made, such as a request for a most likely fix, and the time the answer to the request is delivered to the final destination, e.g., the receipt of the most likely fix.

The first processing capability may also refer to the presence and maturity of the data on the first diagnostic server 30. Along these lines, the first diagnostic server 30 may not include a large amount of historical data stored for newer vehicles. In some cases, there may be no data for new vehicles, in which case the first server may be incapable of reliably satisfying a request for a most likely fix.

Given that several different variables may factor into the first processing capability, it is contemplated that the first processing capability may be determined by a predefined formula that assigns weights to the various factors. The formula may produce an overall score (e.g., number), which is representative of the first processing capability.

The second diagnostic server 32 may include a diagnostic algorithm which may be stored thereon and configured to identify a possible vehicle fix based on an assessment of the retrieved diagnostic data according to predefined criteria associated with the diagnostic algorithm. A diagnostic assessment using the algorithm may differ from a diagnostic assessment using the historical database in that the algorithm may not require a comparison of retrieved vehicle data with historical data. Rather, the retrieved vehicle identification and diagnostic data may be all that is needed, with the retrieved vehicle data being entered into the algorithm to determine the most likely fix. Since historical data may not be required when conducting an analysis using with algorithm, there may be advantages with the algorithm, as less data may be involved in the analysis, which may result in faster processing speeds. The diagnostic algorithm may be routinely updated or revised based on feedback from users in the field regarding both positive and negative results of the algorithm.

The second diagnostic server 32 may be also associated with a second processing capability, which may relate to a variety of different factors. The second processing capability may refer to the functional limitations of the algorithm and the latency period (e.g., a second latency period) associated with processing vehicle data to determine a most likely fix. The second latency period may be dependent upon the speed of the communication links which supply the vehicle data to the second diagnostic server 32, the speed of processing data at the second diagnostic server 32, and the speed of the communication links along which information is transmitted from the second diagnostic server 32. In this regard, the second latency period may refer to the time that elapses from the time a request is made, such as a request for a most likely fix, and the time the answer to the request is delivered to the final destination, e.g., the receipt of the most likely fix, based on the applicable pathways, e.g., via a cellular system, Internet, and/or V2X pathways.

As shown in FIG. 1, the first and second diagnostic servers 30, 32, or portions thereof, may be located in a variety of different locations. For instance, the first and second diagnostic servers 30, 32 may be remote from the vehicle, the scan tool 16, and the smartphone 24. It is also contemplated that one or both of the first and second diagnostic servers 30, 32 may be located on the scan tool 16, or on the smartphone 24. It is understood that the storage space and processing capability may be limited on the scan tool 16 and the smartphone 24, and thus, it may not be feasible to include the entireties of the first and second servers on the scan tool 16 and smartphone 24. However, in the case of the algorithm associated with the second server, it may be more feasible to store and operate the algorithm on the scan tool 16 and/or the smartphone 24. With regard to the diagnostic database, it is contemplated that select portions thereof may be downloaded onto the scan tool 16 and/or smartphone 24 to allow for diagnostic analysis using the database locally on the scan tool 16 or smartphone 24. For instance, the most likely solutions that are most commonly associated with the vehicle under test, and the underlying historical data, may be downloaded onto the scan tool 16 and or the smartphone 24, or configured for a particular vehicle from data loaded on the scan tool, as truncated versions of the first server.

The system shown in FIG. 1 also includes a plurality of routers 34 which are operative to route communications between the various sources of data and destinations of the data and the related signals, based on a variety of different factors. In this regard, the routers 34 may be in communication with the ECU, the scan tool 16, the smartphone 24, the first server, and the second server to facilitate communications within the system of FIG. 1. The decisions made by the router 34 as to a given destination may be determined by one or more factors including, but not limited to, the number of available resources, the capability of the available resources, the processing speed of the available resources, an urgency associated with the vehicle data, and a desired functionality. The router 34 may be implemented on a remote computer accessible via the cloud, or alternatively, the router 34 may be stored on the scan tool 16, the smartphone 24, or on the vehicle. In this case of the router 34 being stored on the vehicle 10, it is contemplated that the router may be integrated into the vehicle ECU 12, or alternatively, the router 34 may be integrated into structure commonly associated with a vehicle, such as a vehicle license plate frame, and which may have communication capabilities, such as to communication with a V2X infrastructure. For more information regarding such structures, please refer to U.S. Patent Application Publication No. 2020/0092694 entitled Method and System for Communicating Vehicle Position Information to an Intelligent Transportation System, the contents of which are expressly incorporated herein by reference.

Each router 34 may include the necessary hardware and software for deciding when and where to send data, alerts or signals. In this regard, the router 34 may include a communication circuit for sending and receiving data, alerts or signals, as well as a data processing circuit for processing data or other information needed to implement the functionality of the router.

In one embodiment, the router 34 may be configured to receive a data packet, analyze the data packet to identify a functionality associated with the data packet, and then identify available resources and their associated processing capabilities e.g., VIN decoders, parts/services resources, etc. In this regard, the router 34 may be configured to routinely monitor available resources and their associated capabilities. The router 34 may be able to identify more permanent resources, such as those available through the cloud, as well as resources that may be more temporary, such as a resource available in a nearby vehicle, which may be expected to move out of range after a short period of time. By routinely monitoring the available resources, the router 34 may be able to more quickly route data and information upon receiving a data packet.

As an alternative, the router 34 may obtain available resource information after the data packet is received. Accordingly, the router 34 may not routinely monitor available resources, as such routing monitoring may require processing capability on the router that may not be available, e.g., the router 34 may require most, if not all, processing capability for sending and receiving data.

The processing capabilities on the router 34 may allow for the router 34 to identify one or more conditions associated with the received data and execute one or more preprogrammed functions associated with the detected condition. For instance, if the received vehicle data reveals an underlying urgent condition, the router 34 may push out an alert to all nearby receivers. The ability to identify certain conditions may require a memory on the router, which allows for storage of the conditions on the router 34. In this regard, the router 34 may be capable of scanning the received data to see if any portion of the data matches any of the preprogrammed conditions. If a match is detected, the router 34 may execute a stored function associated with the condition.

Figure 2:
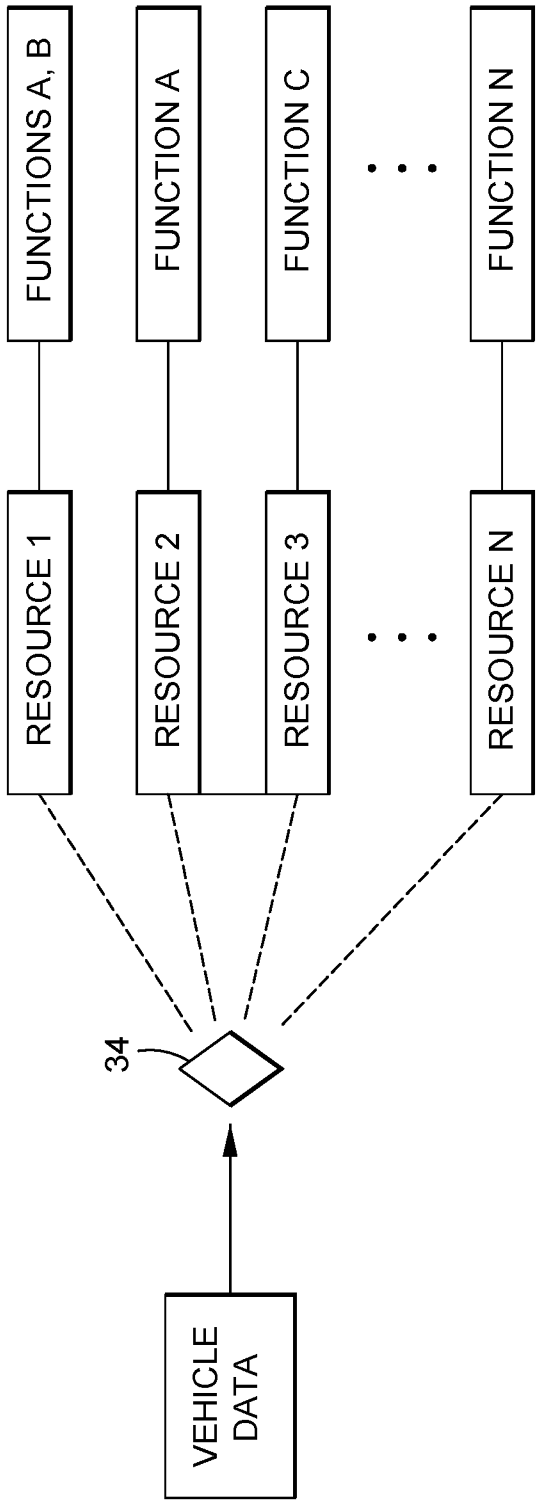
FIG. 2 is a graphical depiction of different resources and functions available to a router for routing vehicle data.
Figure 3:
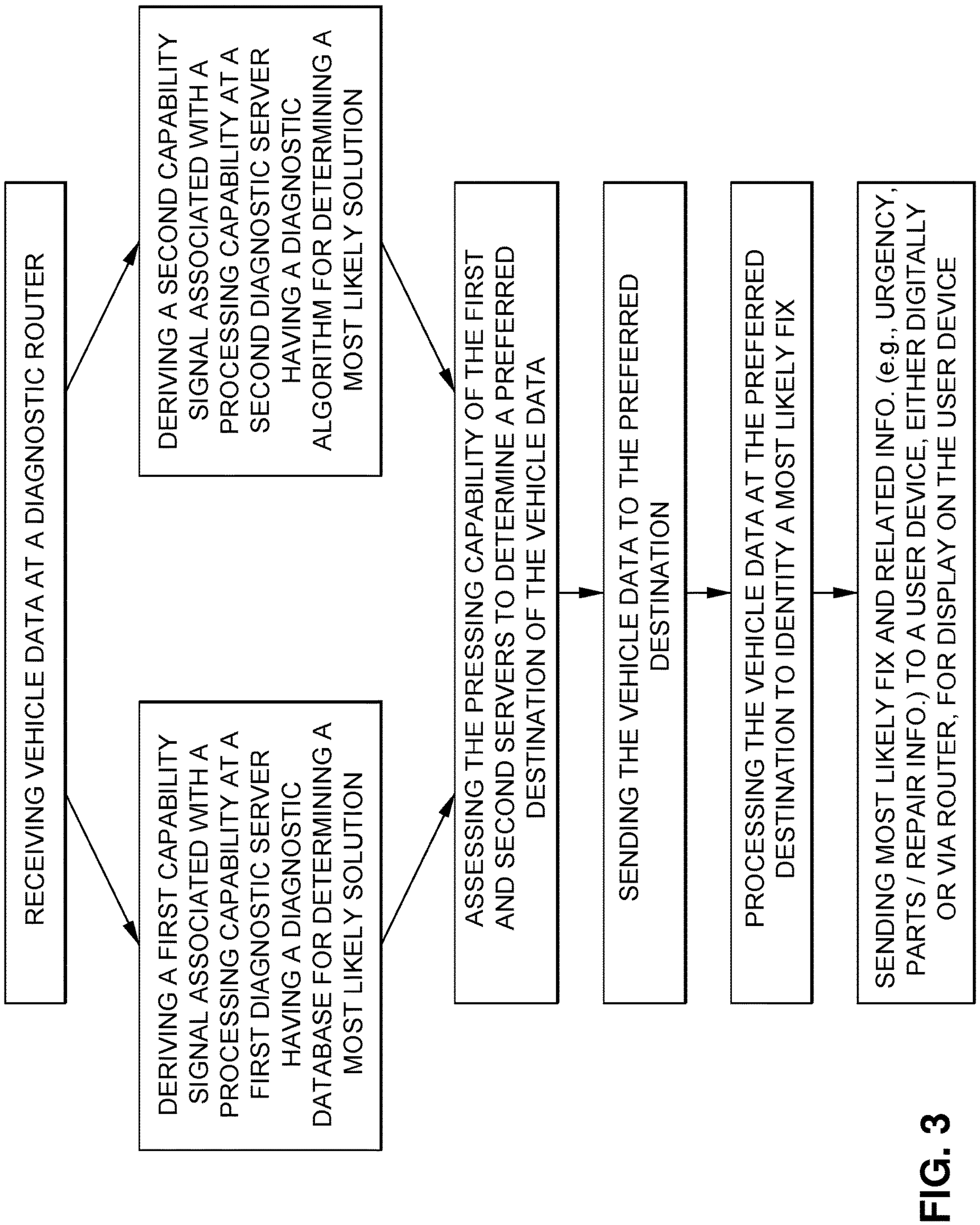
FIG. 3 is a flow chart associated with a vehicle diagnostic method associated with the present disclosure.
Figure 4:
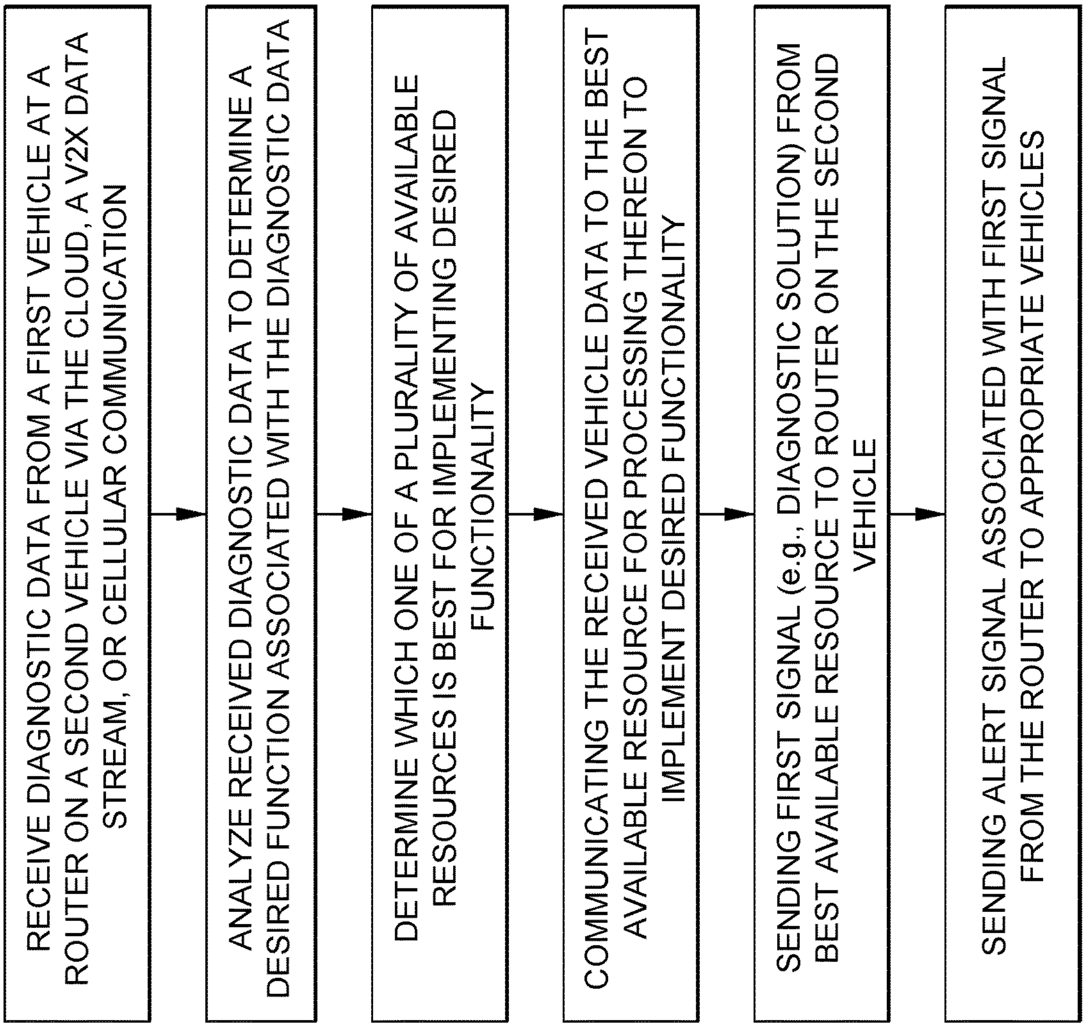
FIG. 4 is a flow chart associated with another embodiment of a vehicle diagnostic method associated with the present disclosure.

Referring now to FIG. 2, there is provided an exemplary illustration of how a router 34 may route vehicle data based on available resources and desired functions. In FIG. 2, Resources 1-N are provided and Functions A-N are identified. Resource 1 is capable of performing Functions A and B, while Resource 2 is capable of only performing Function A. Resource 3 is capable of performing Function C. Thus, when the vehicle data comes into the router, a desired function may also be associated with the vehicle data. The desired function may be selected by a user, or a preprogrammed function. If the preprogrammed function is Function A, then the router 34 may identify Resources 1 and 2 as possible resources for implementing the function, while eliminating the remaining resources as possibilities. Next, the router 34 compares the processing capabilities of Resources 1 and 2, and identifies which resource is associated with the most favorable processing capability. The router 34 then sends the vehicle data to the identified resource for execution of Function A.

If the function associated with the received vehicle data is Function B or Function C, the router 34 may identify that each function is only associated with one resource. Thus, the router 34 would send the vehicle data to the sole available resource, e.g., Resource 1 for Function B and Resource 3 for Function C.

The routing of data, the processing of any vehicle data or information, and/or the generation of any signals, alerts or displays in response to processing the vehicle data may be done autonomously and with minimal or no input by a user (e.g., independent of a user). Rather, the functionalities described herein may be governed by operational instructions (e.g., computer programming) implemented by the various components in the system. For more information regarding autonomous operation of vehicle diagnostics, please refer to U.S. Pat. No. 9,824,507, entitled Mobile Device Based Vehicle Diagnostic System, the contents of which are expressly incorporated herein by reference.

The following examples illustrate variations uses of the router.

Example 1—Determining Database or Algorithm for Diagnostic Analysis

As described above, a diagnostic assessment of data retrieved from the vehicle may include analysis of the vehicle data at the first server or the second server to identify a most likely fix. The determination of whether to use the first server or the second server may include a comparison of the first processing capability and the second processing capability. The more favorable of the first and second processing capabilities may be identified by the router 34 and the vehicle data may be transmitted to the corresponding server.

For instance, if the first and second servers are both capable of analyzing the data, but the first server has a higher latency period that the second server, then the router 34 may send the vehicle data to the second server to obtain a quicker answer. As another example, if the algorithm has not been formulated to handle vehicle data from the vehicle under test, the router 34 may send the vehicle data to the first server.

Example 2—Distributing a V2X Alert

A V2X infrastructure allows vehicles to communicate with each other. Oftentimes, communications over a V2X network allow for collision avoidance, and for more efficient routing of a vehicle to its destination.

It is contemplated that the router 34 described herein by be used to send and receive communication signals to and from a V2X infrastructure to enhance the safety and efficiency of vehicles associated with the V2X infrastructure.

For instance, if it is determined, based on an analysis of vehicle data, that a particular vehicle is likely to be experiencing a potentially critical diagnostic issue, an alert may be communicated to vehicles within a given proximity to the problematic vehicle to make those adjacent drivers, or adjacent navigation systems more aware of the problematic vehicle. In view of the alert, the adjacent drivers or navigation systems may adopt a more defensive posture around the problematic vehicle. By processing the alert, the system may confirm the urgency, or may determine that the condition is not urgent, for the particular vehicle on which the condition exists.

The alert may be generated at the resource that identifies the critical condition. For instance, the alert may be generated at the first and second servers, which may be have a list of most likely fixes that are critical, such that if one of those most likely fixes is identified, the server may generate the alert signal, which may be sent to the router. When the router 34 receives the alert signal, the router may push the alert signal out to all nearby receivers in the network. In this regard, the alert may be received by adjacent vehicles, adjacent smartphones 24, adjacent scan tools 16, adjacent pedestrian control signals, adjacent traffic control signals, etc., which may take appropriate action when receiving the alert. The router may cease normal communications until the alert signal has been relayed to the appropriate destinations.

Example 3—Managing Communications Based on Urgency

Similar to the alert discussed above, it is contemplated that operation of the router 34 may be dictated by a diagnostic urgency associated with a most likely fix. For instance, certain diagnostic conditions may be associated with a low urgency (e.g., gas cap is loose), while other conditions may be associated with a high urgency (e.g., brake failure). For a more detailed discussion regarding determination of diagnostic urgency, please refer to U.S. Pat. No. 9,761,062 entitled A Method and Apparatus for Indicating an Automotive Diagnostic Urgency, the contents of which are expressly incorporated herein by reference.

When the vehicle data or the most likely fix is associated with a high urgency, the router 34 may execute preprogrammed actions to mitigate the urgent condition. For instance, the router 34 may send a signal to the vehicle associated with the highly urgent condition for display on the vehicle's console. It is also contemplated that the router 34 may send a signal to the scan tool 16 or the smartphone 24 for display thereon.

It is also contemplated that the router 34 may send an alert to other electronic addresses associated with the vehicle, such as the e-mail address or SMS address of another registered individual associated with the vehicle (e.g., to the parent of a teenage driver) to make them aware of the urgent condition. The router 34 may also send a message to a nearby repair shop to order any parts, schedule a repair, or request a bid for fixing the highly urgent condition.

Example 4—Efficient Use of In-Network Resources

Another exemplary use of the router 34 may relate to its ability to identify nearby resources as being available for executing a desired function. For instance, a vehicle may have a scan tool 16 plugged into its diagnostic port and routinely scanning for vehicle data. When a problem arises, as evidenced in the diagnostic data (e.g., the presence of one or more DTCs), it may be desirable to upload the diagnostic data to one of the first or second servers. Although the resources locally available in the vehicle may not include the first or second servers, it is contemplated that one or more adjacent vehicles may have resources including one or both of the first and second servers. For instance, a scan tool 16 in an adjacent vehicle may include diagnostic algorithm. Thus, the router 34 may consider the processing capabilities of any nearby first and second server that is communicable with the router.

The use of resources in adjacent vehicles may be facilitated through a subscription network, wherein subscribers to the network share their resources to allow for more resource availability.

As noted above, several aspects of the present disclosure pertain to receiving a data packet associated with the vehicle and identifying, at the router 34, a functionality associated with the data packet. The router 34 may also be configured to identify an available resource to facilitate the identified functionality. A signal associated with the data packet may be sent to the identified available resource to facilitate execution of the identified functionality.

It is also contemplated that the data packet may be analyzed to determine a condition associated with the data packet, and that the identified functionality may be based on the determined condition. For instance, the condition may be an abnormal diagnostic condition (e.g., failed fuel pump), and the functionality may include identifying the repair part or repair service, and an available source for the identified repair part or repair service, based on the abnormal diagnostic condition. Thus, the system may be optimized to quickly and easily provide the user with a diagnosis of the vehicle, based on an analysis of the data packet, while also identifying nearby repair stores/shops that can provided the part or service. All of the foregoing steps may proceed autonomously, e.g., independent of user input.

The abnormal diagnostic condition may also lead the system to initialize a symptomatic diagnostic module which may query the user to provide symptomatic information to assist in determining a possible diagnosis or a possible urgency associated with the detected abnormal diagnostic condition. For instance, the system may analyze diagnostic data and identify one or more possible problems with the vehicle. In response to that identification, a symptomatic diagnostic module (e.g., hardware having symptom-based diagnostic rules included in computer executable instructions) may be initiated by the router 34. The symptomatic diagnostic module may receive the preliminary diagnostic assessment (e.g., the identified one or more possible problems) as well as the vehicle identification information to provide vehicle specific symptomatic questions for the user. For instance, the questions may include, “do you see smoke?” “do you smell an odor?” “is the engine temperature high?” “do you hear an odd sound?” etc. These questions may be sent to a user’s smartphone, which may be played back through the audio system on the vehicle. Alternatively, the questions may appear on the user’s smartphone, which the user may interact with once the vehicle is safely parked.

It is further contemplated that the condition may be an abnormal operational condition, such as a detected abnormal speed (below the speed limit by a prescribed amount or above the speed limit by a prescribed amount), a detected abnormal engine temperature, or other abnormal operating parameters. The system may be capable of executing several preprogrammed functions in response to detection of the abnormal operating condition. For instance, if a low operational speed is detected, the router 34 may assume the associated vehicle is experiencing traffic congestion and may try and identify a new navigational route by identifying one or more available navigational resources to facilitate identification of the new route.

In another embodiment, the router 34 may be used to report the abnormal operating conditions to the parent of a teenage driver. If the driver is operating the vehicle recklessly (e.g., at high speeds, or outside of a defined radius), the router 34 may determine the best way to send the electronic message (e.g., sms message, email, etc.) to the parent.

The abnormal operating condition may also be representative of the vehicle being in an accident. For instance, the router 34 may analyze a drastic change in vehicle speed/acceleration, as well as possible detected sound data, etc., to assume that an accident has occurred and that response authorities (e.g., police, fire department, ambulance) should be alerted, as well as sending an alert to a preprogrammed electronic address (e.g., sms message or email) to a family/friend.

The abnormal operating condition may also be representative of low power, in the case of electrically powered vehicles, or low gas/diesel/hydrogen/etc., in the case of non-electrically powered vehicles. The router 34 may be able to determine nearby power/fuel sources based on the needs of the vehicle.

The router 34 may also find particular use in fleet management applications. For instance, vehicle performance parameters may be detected and used to optimize deployment and management of a fleet of vehicles. If one vehicle is detected as being behind schedule or ahead of schedule, the router may communicate with a fleet management server to reshuffle the fleet to optimize the use of the fleet. Thus, the vehicle performance parameter may include real-time progress of a vehicle along a preprogrammed route. In this regard, the fleet management server may add stops to a vehicle ahead of schedule and take away stops from a vehicle that is behind schedule. The fleet management server may refer to hardware having computer executable instructions running thereon with rules or instructions for optimizing a given fleet of vehicles based on a specified schedule.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A vehicle diagnostic method comprising:

receiving, at a router, vehicle data associated with a first vehicle;

receiving, at the router, information related to processing capabilities of a plurality of diagnostic resources;

identifying, at the router, an identified diagnostic resource from among the plurality of diagnostic resources for processing the vehicle data to identify a possible vehicle fix, the identification being based on a combined assessment of the vehicle data and the processing capabilities of the plurality of diagnostic resources, the identified diagnostic resource being located in a second vehicle;

sending the vehicle data to the identified diagnostic resource to determine the possible vehicle fix;

receiving the determined possible vehicle fix from the identified diagnostic resource; and sending the possible vehicle fix to an electronic device associated with the first vehicle.

2. The vehicle diagnostic method recited in claim 1, further comprising the steps of:

determining an urgency associated with the possible vehicle fix as being one of a high urgency or a low urgency; and generating an alert signal for communication to a remote electronic device when the urgency is determined to be the high urgency.

3. The vehicle diagnostic method recited in claim 1, wherein the identified diagnostic resource is located on a scan tool operatively connected to the second vehicle.

4. The vehicle diagnostic method recited in claim 1, wherein the identifying step proceeds autonomously in response to receiving the vehicle data at the router.

5. A vehicle diagnostic method comprising:

receiving, at a router, vehicle data associated with a first vehicle;

receiving, at the router, information related to processing capabilities of a plurality of diagnostic resources;

identifying, at the router, an identified diagnostic resource from among the plurality of diagnostic resources for processing the vehicle data to identify a possible vehicle fix, based on a combined assessment of the vehicle data and the processing capabilities of the plurality of diagnostic resources;

sending the vehicle data to the identified diagnostic resource to determine the possible vehicle fix;

receiving the determined possible vehicle fix from the identified diagnostic resource; and sending the possible vehicle fix to an electronic device associated with the first vehicle.

6. The vehicle diagnostic method recited in claim 5, wherein the identifying step includes identifying the diagnostic resource from among a plurality of available diagnostic resources.

7. The vehicle diagnostic method recited in claim 6, wherein the identifying step proceeds autonomously in response to receiving the vehicle data at the router.

8. A vehicle diagnostic method comprising:

receiving, at a router, a data packet associated with a vehicle;

receiving, at the router, information related to functional capabilities of a plurality of diagnostic resources;

identifying, at the router, a functionality associated with the data packet;

identifying, at the router, an available resource from among the plurality of diagnostic resources to facilitate the identified functionality, based on a combined assessment of the identified functionality associated with the data packet and the functional capabilities of the plurality of diagnostic resources; and sending a signal associated with the data packet to the identified available resource to facilitate execution of the identified functionality.

9. The vehicle diagnostic method recited in claim 8, wherein the sending step includes sending the data packet to the identified available resource.

10. The vehicle diagnostic method recited in claim 8, wherein the functionality includes ordering a part associated with the data packet.

11. The vehicle diagnostic method recited in claim 8, wherein the functionality associated with the data packet includes sending an alert to a V2X infrastructure.

12. The vehicle diagnostic method recited in claim 11, wherein the alert is based on a diagnostic condition identified based on an assessment of the data packet.

13. The vehicle diagnostic method recited in claim 8, further comprising the step of analyzing the data packet to identify a condition associated with the data packet, wherein the step of identifying the functionality includes identifying a functionality based on the condition.

14. The vehicle diagnostic method recited in claim 13, wherein the condition is an abnormal diagnostic condition, and the functionality includes identifying a repair part or a repair service based on the abnormal diagnostic condition.

15. The vehicle diagnostic method recited in claim 14, wherein the functionality additionally includes identifying a source for the repair part or repair service.

16. The vehicle diagnostic method recited in claim 13, wherein the condition is an abnormal operational condition, and the functionality includes identifying an optimized navigational route.

17. The vehicle diagnostic method recited in claim 13, wherein the abnormal operational condition is a detected operational speed below a speed limit associated with a geographic location of the vehicle.

18. The vehicle diagnostic method recited in claim 13, wherein the condition is a vehicle performance parameter, and the functionality includes optimizing a fleet of vehicles.

19. The vehicle diagnostic method recited in claim 18, wherein the vehicle performance parameter includes real-time progress of a vehicle along a preprogrammed route.

20. The vehicle diagnostic method recited in claim 13, wherein the condition is an abnormal diagnostic condition, and the functionality includes initializing a symptomatic diagnostic module.

21. The vehicle diagnostic method recited in claim 13, wherein the condition is an abnormal diagnostic condition, and the functionality includes initializing a user guidance module.

22. The vehicle diagnostic method recited in claim 13, wherein the condition is an abnormal operational condition, and the functionality includes communicating the abnormal operating condition to a preprogrammed electronic address.

23. The vehicle diagnostic method recited in claim 13, wherein the condition is related to a determined urgency level associated with the vehicle data, and the functionality includes sending an alert in response to the determined urgency level.

24. The vehicle diagnostic method recited in claim 8, further comprising the step of monitoring available resources and determining their associated capabilities.

25. The vehicle diagnostic method recited in claim 24, wherein the step of identifying the available resource is based on the determined capabilities of the monitored available resources.

26. The vehicle diagnostic method recited in claim 24, where the step of monitoring the available resources occurs before the data packet is received.

27. The vehicle diagnostic method recited in claim 24, where the step of monitoring the available resources occurs in response to receipt of the data packet.

28. The vehicle diagnostic method recited in claim 8, further comprising the steps of identifying a condition associated with the received data packet and executing a preprogrammed function associated with the identified condition.

29. The vehicle diagnostic method recited in claim 8, wherein the router is implementable on a handheld communication device.

30. The vehicle diagnostic method recited in claim 8, wherein steps of identifying the functionality, identifying the available resource, and sending the data packet are done autonomously in response to receiving the data packet.

* * * * *